P. A. LEONARD.
MANUFACTURE OF MULTIPLE THROW CRANK SHAFTS.
APPLICATION FILED FEB. 24, 1913.

1,070,619.

Patented Aug. 19, 1913.
2 SHEETS—SHEET 1.

WITNESSES
Edward A. Wright
S. R. Bell

INVENTOR
Patrick A. Leonard,
by [signature]
atty

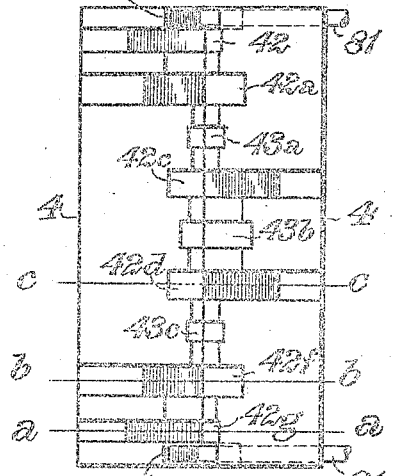
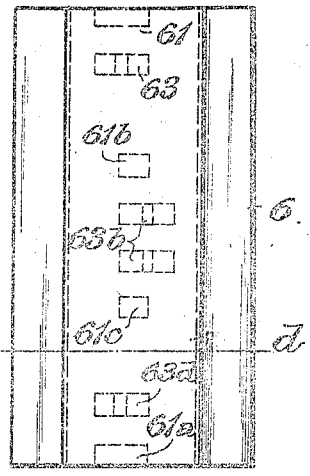
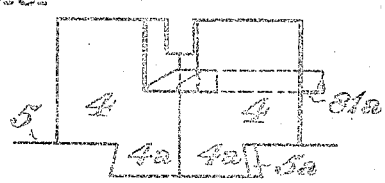
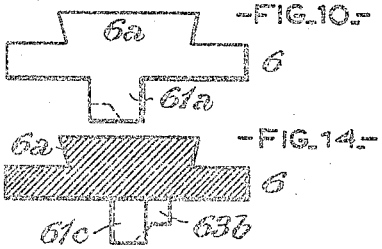
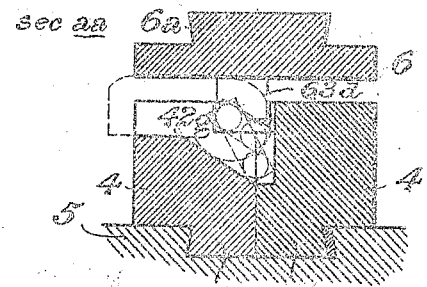
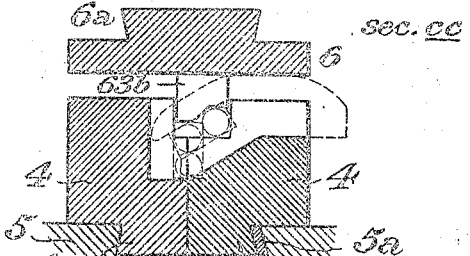
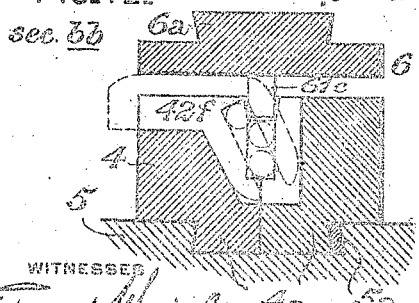
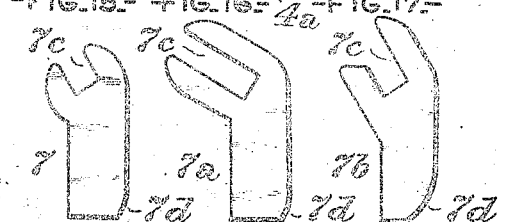

_UNITED STATES PATENT OFFICE._

PATRICK A. LEONARD, OF SCHENECTADY, NEW YORK.

MANUFACTURE OF MULTIPLE-THROW CRANK-SHAFTS.

1,070,619.      Specification of Letters Patent.      Patented Aug. 19, 1913.

Application filed February 24, 1913. Serial No. 750,144.

_To all whom it may concern:_

Be it known that I, PATRICK A. LEONARD, of Schenectady, in the county of Schenectady and State of New York, have invented a certain new and useful Improvement in the Manufacture of Multiple-Throw Crank-Shafts, of which improvement the following is a specification.

My invention relates to the manufacture of crank shafts having a plurality of crank arms, crank pins, and journals, formed of a single piece of metal, and its object is to provide a method of, and means for, so treating a preliminarily formed blank for a shaft of such character, as to impart to the crank arms the proper relative angular relation, and dispose all the journals in the same axial line, and the crank pins in such relation, one to another, that they shall have the desired sequence and angular advance, in their rotation about said axial line.

Further objects of my invention are to insure a perfect alinement of the crank shaft journals and crank pins, in order to economize labor and material in machining, and to set the cranks in proper relative positions before being cooled, so as to avoid springing after being machined, and to eliminate opposed fiber stresses in the material, thereby producing a stronger and more perfect shaft, with lower cost, than is practicable in the ordinary practice of manufacture.

The improvement claimed is hereinafter fully set forth.

Figure 1:
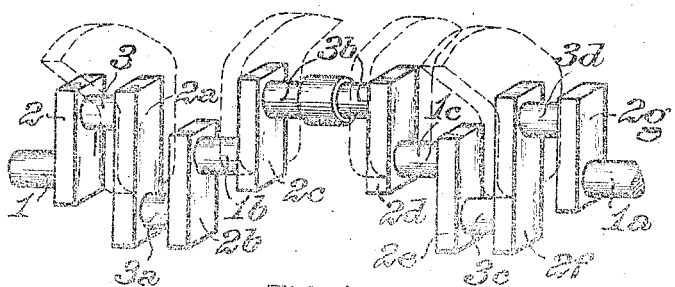
Figure 2:
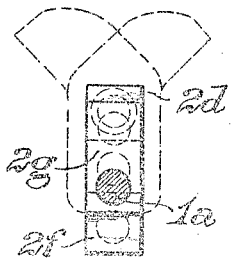
Figure 3:
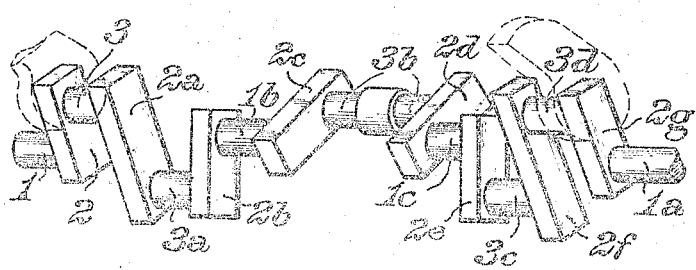
Figure 4:
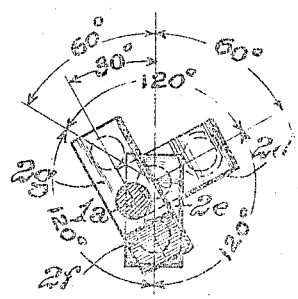
Figure 5:
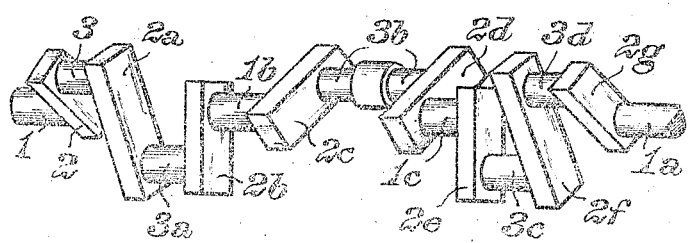
Figure 6:
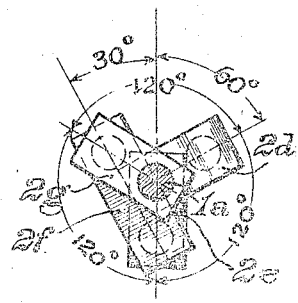

In the accompanying drawings: Figure 1 is a view, in elevation, of a preliminarily formed crank shaft blank, suited for the application of my invention, as seen inclined to the lines of vision; Fig. 2, an end view of the same; Fig. 3, a view, similar to Fig. 1, showing the blank in the form which is imparted to it by the first bending operation; Fig. 4, an end view of the blank shown in Fig. 3; Fig. 5, a view, similar to Fig. 1, of the completely formed crank shaft; Fig. 6, an end view of the same; Fig. 7, a plan or top view of the fixed bottom die; Fig. 8, an end view of the same; Fig. 9, a plan or top view of the movable top die; Fig. 10, an end view of the same; Figs. 11, 12 and 13, transverse sections through the dies, on the lines $aa$, $bb$, and $cc$, respectively, of Fig. 7; Fig. 14, a similar section through the top die, on the line $dd$ of Fig. 9; and, Figs. 15, 16, and 17, side views, in elevation, of the bending wrenches.

My invention is herein exemplified as applied in alining the shaft journals and bringing into proper relation, one to the others and to the shaft journals, the several crank arms of a preliminarily formed multiple throw crank shaft, comprising end journals, 1, $1^a$, intermediate journals, $1^b$, $1^c$, and crank arms 2, $2^a$, $2^b$, $2^c$, $2^d$, $2^e$, $2^f$, and $2^g$, which are connected one to another by crank pins, 3, $3^a$, $3^b$, $3^c$, and $3^d$, all the crank arms being, in the preliminary blank operated on in the same longitudinal plane and perpendicular to the axial line of the crank shaft, as shown in Figs. 1 and 2.

For the practice of my invention, I provide a fixed bottom die and a movable top die, the former comprising two sections, 4, 4, adapted to abut longitudinally one against the other, and having dovetailed tongues, $4^a$, on their lower sides, fitting, when the sections are brought into contact, in a recess in a suitable base, 5, within which they are secured by wedges, $5^a$. The bottom die sections are provided with a plurality of recesses or pockets, adapted to receive different portions of the crank shaft blank, these being formed and disposed as follows, viewing the crank shaft from the left, in Figs. 1, 3, and 5, and the bottom die sections from the top, in Fig. 7, and considering the registering portions of each of them, in the two die sections, as constituting a single receiving space: A rectangular end recess, 41, which is formed longitudinally at one end of the die sections, in the middle plane thereof, is adapted to receive the end journal, 1, of the crank shaft blank, and a corresponding longitudinal recess, $41^a$, at the opposite end of the die sections, is adapted to receive the opposite end journal, $1^a$. Two parallel flat sided transverse recesses, 42 and $42^a$, are located in position to receive the crank arms, 2 and $2^a$, and two similar recesses, $42^f$ and $42^g$, are located in position to receive the crank arms, $2^f$ and $2^g$. As shown in the transverse sections of the bottom die, Figs. 11 and 12, the recesses, 42 and $42^g$, have a vertical end face in one of the die sections and an opposite inclined face in the other, and the recesses, $42^a$ and $42^f$, are similarly formed, but their inclined faces stand at a greater angle to their bases than those of the recesses, 42 and $42^g$. Next adjoining the recess, $42^a$, a longitudinal recess, $43^a$, substantially rectangular in section, is provided to receive the crank pin, $3^a$, the crank arm, $2^b$, and the journal, $1^b$, and next, adjoining the recess, $42^c$, a similar recess, $43^c$, is formed to receive the crank pin, $3^c$, the crank arm, $2^c$, and the journal, $1^c$. Next adjoining the recess, $43^a$, a transverse recess, $42^c$, is formed to receive the crank arm, $2^c$, and next adjoining the recess, $43^c$, a similar recess, $42^d$, is formed to receive the crank arm, $42^d$. As shown in Fig. 13, the recesses, $42^c$, and $42^d$, correspond in form with the recesses, 42 and $42^g$, but differ therefrom as to the location of their inclined ends, which are in the die section opposite that in which the inclined ends of the recesses, 42 and $42^g$, are formed. The recesses, $42^c$ and $42^d$, are connected by a longitudinal recess, $43^b$, which receives the crank pin, $3^b$.

The movable top die, 6, is a strong and heavy plate of metal, corresponding in form and dimensions with the fixed bottom die, when the sections of the latter are connected for operation, and is provided, on its upper side, with a longitudinal dovetail tongue, $6^a$, for connection with any suitable known means for moving it toward and from the bottom die in the operation of bending the crank arms of the preliminary blank into desired angular relation. Projections, $61^b$ and $61^c$, are formed on the bottom of the die, 6, in position to be brought against the journals, $1^b$ and $1^c$, of the blank, when said journals rest in the recesses, $43^a$ and $43^c$, and projections, 61 and $61^a$, depend from the bottom of the die, 6, in position to be brought against the journals, 1 and $1^a$. Projections, 63 and $63^d$, are formed on the bottom of the die, 6, in position to be brought against the crank pins, 3 and $3^d$. Projections, $63^b$, are also formed on the bottom of the die, 6, in position to be brought against the crank pin, $3^b$, on opposite sides of a collar which is shown as formed on the middle portion thereof.

I also provide a set of bending wrenches, 7, $7^a$, and $7^b$, each of which comprises a straight body of rectangular section, and a laterally inclined head, the angles of which heads to the bodies are in conformity with those desired for the crank arms to which the wrenches are to be applied. A jaw, $7^c$, is formed in the head of each of the wrenches, and a curved cam surface, $7^b$, is formed on the end of the body.

In the operation of my invention, the preliminary crank shaft blank, in the form shown in Figs. 1 and 2, having been heated to a proper temperature, is placed in the bottom die, which holds the crank arms, $2^b$ and $2^c$, rigidly in a vertical position, and engages with the crank pins, $3^a$ and $3^c$, and with the intermediate journals, $1^b$ and $1^c$. The jaws of two of the wrenches, $7^a$, are also applied to the crank pins, 3 and $3^d$, and those of two wrenches, $7^b$, to the crank pin, $3^b$, the opposite ends of the wrenches being located in position to be acted on by the top die, 6. The top die, 6, is then forced downwardly, in the ordinary manner, and the crank pins, 3 and $3^d$, together with the crank arms, 2, $2^a$, $2^f$, and $2^g$, are bent until said crank arms are brought to an angle of 30 degrees to the vertical plane, as indicated in Figs. 3 and 4. The crank pin, $3^b$, together with the crank arms, $2^c$ and $2^d$, is also bent, in the opposite direction, until said crank arms are brought to an angle of 60 degrees with the vertical plane. This bending operation is effected by the pressure of the top die, 6, on the curved cam surfaces of the wrenches, the downward movement of which is properly limited by the bottoms of the recesses in the fixed bottom die. The release or upward stroke of the top die completes the first operation, at the termination of which it will be seen that the crank arms, 2 and $2^g$, remain at the same inclination as the adjacent crank arms, $2^a$ and $2^f$, and that the journals, 1 and $1^a$, are out of line with the journals, $1^b$ and $1^c$. The crank shaft blank is brought to completed form by a second operation, preparatory to which wrenches, 7, are engaged with the crank pins, 3 and $3^d$. The top die, 6, is then again forced downward, and the crank arms, 2 and $2^g$, are brought to an angle of 60 degrees with the vertical plane, being bent until the wrenches come in contact with the bottoms of the recesses of the bottom die, with which they are in line, and the journals, 1 and $1^a$, are forced into line axially with the journals, $1^b$ and $1^c$. To insure such axial alinement, wedge bars, 81, $81^a$, are driven transversely in the bottom die, below the journals, 1 and $1^a$, and, by their wedging action, force said journals firmly against the correspondingly wedge formed downward projections, 61 and $61^a$, of the top die, 6. The downward projections, 63 and $63^d$, similarly bear against and hold the crank pins, 3 and $3^d$, and the downward projections $63^b$, have the same effect on the crank pin, $3^b$. The release or upward movement of the top die completes the second bending operation, by which the crank shaft is brought to proper form for being machined, its crank pins being then disposed on axial lines 120 degrees apart. At the conclusion of the second operation, the wrenches are removed and the wedge bars drawn out to the dotted position shown in Fig. 8, after which the dies will be in readiness for repetition of the operations above described.

It will be obvious that by increasing the length of the dies and the number of recesses and projections therein and thereon, they may be adapted to the manufacture of crank shafts having a greater number of cranks than that herein described, and, conversely, may be adapted to the manufacture of crank shafts having a less number of ranks, by correspondingly decreasing the number of the recesses and projections.

I claim as my invention and desire to secure by Letters Patent:—

1. In an apparatus for the manufacture of multiple throw crank shafts, the combination of a fixed bottom die having a plurality of recesses, each adapted to receive a portion of a preliminarily formed blank, a movable top die having projections located in position to be brought against portions of such blank, and means actuated by the movement of the top die, for bending crank arms of the formed blank out of their original positions.

2. In an apparatus for the manufacture of multiple throw crank shafts, the combination of a fixed bottom die having a plurality of recesses, each adapted to receive a portion of a preliminarily formed blank, a movable top die having projections located in position to be brought against portions of such blank, and a plurality of bending wrenches, actuated by the movement of the top die, each having a jaw adapted to engage a portion of the formed blank.

3. In an apparatus for the manufacture of multiple throw crank shafts, the combination of a fixed bottom die having a plurality of recesses, each adapted to receive a portion of a preliminarily formed blank, a movable top die having projections located in position to be brought against portions of such blank, and movable wedge bars projecting into recesses of the bottom die in position to abut against journal portions of the formed blank.

4. In an apparatus for the manufacture of multiple throw crank shafts, the combination of a laterally separable sectional fixed bottom die, having a plurality of recesses, each adapted to receive a portion of a preliminarily formed blank, means for securing the sections of the bottom die in a supporting base, a movable top die having projections located in position to be brought against portions of such blank, and means, actuated by the movement of the top die, for bending crank arms of the formed blank out of their original positions.

PATRICK A. LEONARD.

Witnesses:
 CHARLES L. HEISLER,
 WILL W. HAMBLY.